United States Patent
Betro' et al.

(10) Patent No.: US 12,088,233 B2
(45) Date of Patent: Sep. 10, 2024

(54) PROCESS AND AN APPARATUS FOR CONTROLLING AN ELECTRIC MOTOR

(71) Applicant: FERRARI S.p.A., Modena (IT)

(72) Inventors: Roberto Betro', Modena (IT); Andrea Benoit Abbiati, Modena (IT); Ugo Sitta, Modena (IT); Giuseppe Agnello, Modena (IT); Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 17/858,477

(22) Filed: Jul. 6, 2022

(65) Prior Publication Data
US 2023/0024889 A1 Jan. 26, 2023

(30) Foreign Application Priority Data

Jul. 15, 2021 (IT) .......................... 102021000018689

(51) Int. Cl.
*H02P 5/50* (2016.01)
*B60K 1/02* (2006.01)
*H02P 6/18* (2016.01)

(52) U.S. Cl.
CPC .................. *H02P 5/50* (2013.01); *B60K 1/02* (2013.01); *H02P 6/18* (2013.01); *B60L 2240/423* (2013.01)

(58) Field of Classification Search
CPC ...................................... H02P 5/50; H02P 6/18
See application file for complete search history.

(56) References Cited

U.S. PATENT DOCUMENTS

| 2011/0241583 | A1* | 10/2011 | He | H02P 27/08 318/400.09 |
| 2012/0063922 | A1 | 3/2012 | Sano et al. | |
| 2016/0134218 | A1* | 5/2016 | Yamaguchi | B60L 15/025 318/139 |
| 2016/0329852 | A1* | 11/2016 | Bouallaga | H02P 25/0805 |
| 2020/0259431 | A1* | 8/2020 | Sawada | H02P 5/46 |

FOREIGN PATENT DOCUMENTS

| EP | 2662974 A1 | 11/2013 |
| WO | 2020188693 A1 | 9/2020 |

OTHER PUBLICATIONS

Italian Search Report for Application No. 102021000018689 completed Mar. 31, 2022.

* cited by examiner

*Primary Examiner* — Kawing Chan
(74) *Attorney, Agent, or Firm* — CANTOR COLBURN LLP

(57) ABSTRACT

A process for controlling an electric motor includes providing a functional relationship, which associates a first and a second quantity, indicative of a torque delivered by the electric motor and of the supply voltage respectively, with a speed parameter of the electric motor, determining a pair of values of the first and of the second quantity, determining a value of a third quantity indicative of an output speed of the electric motor, determining a value of the speed parameter corresponding to the pair of values determined through the functional relationship, determining a value of a fourth quantity indicative of a difference between the value of the speed parameter and the value of the third quantity, determining a target value for the first quantity as a function of the value of the fourth quantity, and controlling the electric motor according to the determined target value.

17 Claims, 5 Drawing Sheets

# PROCESS AND AN APPARATUS FOR CONTROLLING AN ELECTRIC MOTOR

CROSS-REFERENCE TO RELATED APPLICATIONS

This patent application claims priority from Italian patent application no. 102021000018689 filed on Jul. 15, 2021, the entire disclosure of which is incorporated herein by reference.

TECHNICAL SECTOR

The invention relates to a process and an apparatus for controlling an electric motor, in particular an electric motor driving a vehicle.

PRIOR ART

According to the state of the art, the electric motor driving an electric or hybrid vehicle can be powered with a supply voltage set by means of a static converter.

In this case, the electric motor has a mechanical characteristic, namely a relationship between torque and speed of the electric motor, which depends on the supply voltage.

Typically, the mechanical characteristic can conveniently be represented by means of a curve in a torque-speed diagram.

Generally speaking, the area delimited by the curve and by the axes of the diagram defines a zone of controllability of the electric motor, in which the motor correctly responds to the control signals.

The electric motor can be controlled in a torque-based manner, namely according to a control law that pursues a target signal of the torque delivered by the motor.

In this case, the target signal is determined as a function of a request of the driver of the vehicle, for example expressed by operating an accelerator pedal of the vehicle.

In some operating conditions, based on the instantaneous state of the vehicle and of the electric motor, the driver could express a request exceeding the zone of controllability of the electric motor.

This clearly causes a disadvantageous condition, since the electric motor would have to operate in a substantially uncontrollable manner.

Therefore, in general, there is a need to avoid the aforesaid disadvantageous condition as much as possible.

An object of the invention is to fulfill the need discussed above.

DESCRIPTION OF THE INVENTION

The aforesaid object is reached by a process and an apparatus for controlling an electric motor as claimed in the appended claims.

The dependent claims define special embodiments of the invention.

BRIEF DESCRIPTION OF THE DRAWINGS

Hereinafter, embodiments of the invention will be described, in order to allow the latter to be better understood, by way of non-limiting example and with reference to the accompanying drawings, wherein.

EMBODIMENTS OF THE INVENTION

Figure 1:
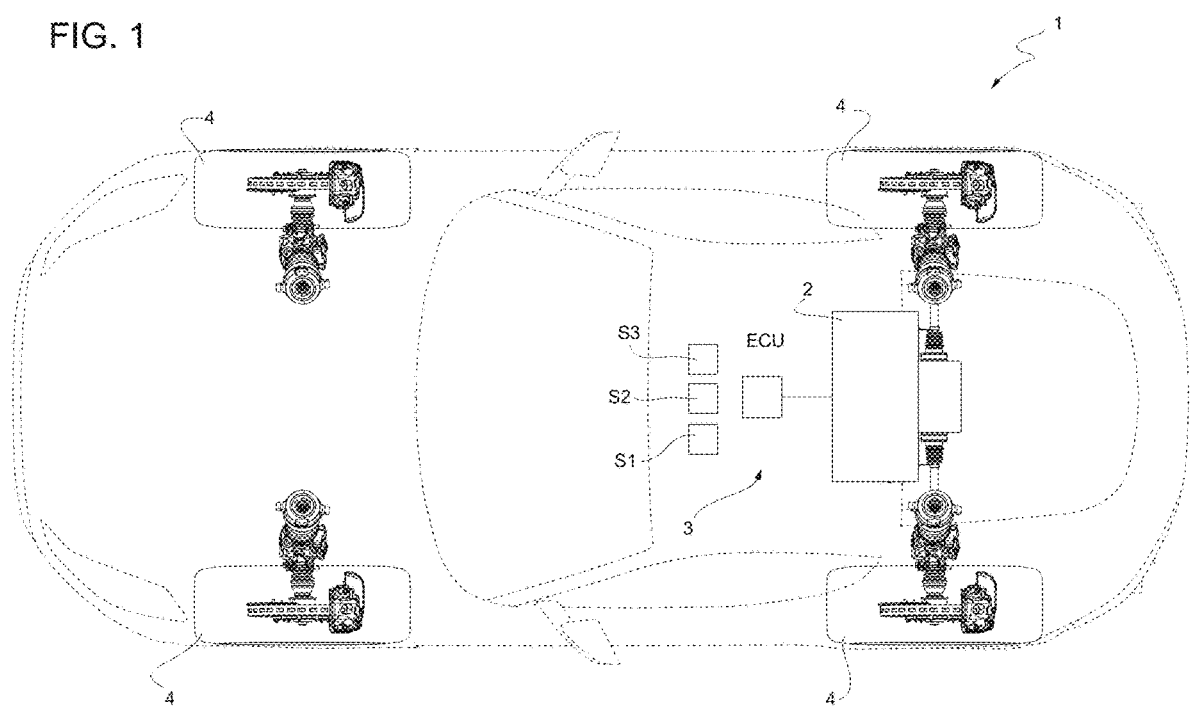
FIG. 1 shows a vehicle comprising an electric motor and an apparatus for controlling the motor according to an embodiment of the invention.

In FIG. 1, reference number 1 is used to indicate, as a whole, a vehicle.

The vehicle 1 comprises, in particular, two pairs of wheels 4 and an electric motor 2 coupled to at least one of the two pairs of wheels 4 for driving the vehicle 1. Therefore, the motor 2 is an electric motor driving the vehicle 1.

Furthermore, the vehicle 1 comprises an apparatus 3 configured to control the motor 2. The apparatus 3 comprises at least one control unit ECU configured to actuate a process for controlling the motor 2.

The control unit ECU provides or stores a functional relationship, which associates a first and a second quantity T, $V_{dc}$ with a speed parameter $\omega_{lim}$ of the motor 2.

The first quantity T is indicative of a torque delivered by the motor 2; the second quantity $V_{dc}$ is indicative of a supply voltage of the motor 2. For example, the quantity $V_{dc}$ can be indicative of a direct voltage, in particular adjustable by means of a power converter, more in particular a static converter. In other words, the motor 2 may comprise a power converter to adjust the supply voltage of the motor 2.

The parameter $\omega_{lim}$ corresponds to a limit output speed for the motor 2.

More precisely, the parameter $\omega_{lim}$ represents a controllability limit of the motor 2, which means that exceeding the output speed corresponding to this limit at the values of the quantities T, $V_{dc}$ associated with the latter leads to an operation of the motor 2 under conditions of substantial uncontrollability.

More in detail, the functional relationship comprises two further functional relationships between the parameter $\omega_{lim}$ and the quantities T, $V_{dc}$, respectively. More precisely, the composition of the two further functional relationships defines the functional relationship provided or stored by the control unit ECU.

Each one of the functional relationships can be expressed by means of a table, a diagram, an equation and the like, or in any other suitable form.

The functional relationship, depending, in turn, on the quantity $V_{dc}$, between the parameter $\omega_{lim}$ and the quantity T defines what is normally known as mechanical characteristic of the motor 2. For example, FIG. 2 shows the mechanical characteristic of the motor 2 for a specific value of the quantity $V_{dc}$.

Figure 2:
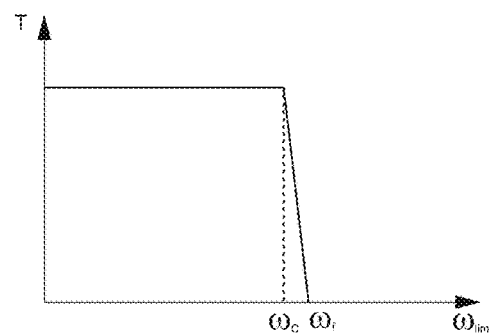
FIG. 2 is a function diagram, which represents a functional relationship between a torque delivered by the motor and a speed parameter of the motor representing a controllability limit of the motor.

The mechanical characteristic of FIG. 2 comprises a constant segment for the quantity T, as a function of the parameter $\omega_{lim}$, up to a critical threshold value $\omega_c$, starting from which it comprises a segment decreasing up to zero, specifically in a linear manner.

The decreasing segment can, in some cases, have an extremely sharp inclination, so that the decreasing segment can be neglected, namely omitted. In this case, the mechanical characteristic is considered as entirely defined by its constant segment. The constant segment associates the critical threshold value $\omega_c$ with any value of the quantity T.

Therefore, the parameter $\omega_{lim}$ is constant with respect to the quantity T, in particular constantly equal to the critical threshold value $\omega_c$, or it increases as the quantity T decreases, in particular increases from the critical threshold value $\omega_c$ up to an escape value $\omega_f$ associated with a zero value for the quantity T.

Clearly, the first case mentioned above occurs when the decreasing segment is omitted; otherwise, the last case occurs.

In the first case, the parameter $\omega_{lim}$, namely, in this specific case, the critical threshold value $\omega_c$, will practically depends on the sole quantity $V_{dc}$. In the last case, the parameter $\omega_{lim}$ will depend on both quantities T, $V_{dc}$. In particular, both the critical threshold and the escape value $\omega_c$, $\omega_f$ will depend on the quantity $V_{dc}$ and more in particular will increase with the latter.

More in general, the mechanical characteristic could be different from the one shown in FIG. 2, based on the type of motor 2. As a matter of fact, FIG. 2 is typical for direct current motors. For example, the constant segment could be lacking, so that the mechanical characteristic would be defined by the decreasing segment, for example decreasing in a linear or non-linear manner. Alternatively, the mechanical characteristic could be bell-shaped or have any shape known to a person skilled in the art.

Hence, the mechanical characteristic can be represented by a curve in a diagram similar to FIG. 2, whose axes represent the quantities T, $V_{dc}$. The area subtended by the curve, namely the area defined by the curve and by the axes, represents a zone of controllability of the motor 2, namely a state of the motor 2 in which the latter is controllable. The remaining area represents a zone of non-controllability of the motor 2, namely a state of the motor 2 in which the latter is uncontrollable.

The functional relationship between the parameter $\omega_{lim}$ and the quantity $V_{dc}$ implies that the parameter $\omega_{lim}$ increases as the quantity $V_{dc}$ increases, in particular in a linear manner.

Figure 3:
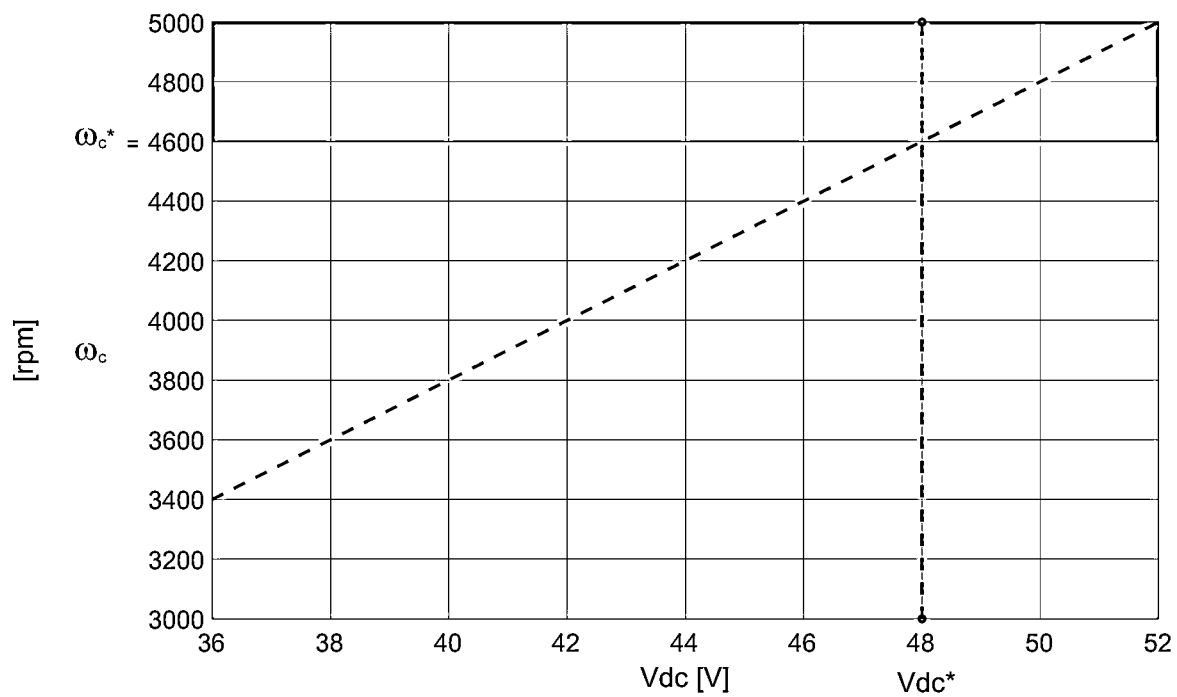
FIG. 3 is a function diagram, which represents a further functional relationship between a supply voltage of the motor and the speed parameter of FIG. 2.

Specifically, FIG. 3 shows the critical threshold value $\omega_c$ as a function of the quantity $V_{dc}$. Assuming that the mechanical characteristic is defined by the constant segment, the area of FIG. 3 under the particular critical threshold value $\omega^*_c$ for a specific value $V^*_{dc}$ of the quantity $V_{dc}$ corresponds to the zone of controllability of the motor 2. On the other hand, the area of FIG. 3 above the same critical threshold value $\omega^*_c$ corresponds to the zone of non-controllability of the motor 2.

So far, the description relates to the absolute values of the quantities T, $V_{dc}$ and of the parameter $\omega_{lim}$. However, the quantities T, $V_{dc}$ and the parameter $\omega_{lim}$ can also be considered with their own sign, in the light of adaptive considerations resulting in an evident manner for a person skilled in the art.

The control unit ECU is configured to sample the acquired or received signals according to a sampling time, for example a constant sampling time, in particular in the order of 1 ms.

The control unit ECU is further configured to emit control signals, for example for the motor 2, in particular according to the sampling time.

More in detail, the control unit ECU emits control signals of the quantities T, $V_{dc}$. In particular, the quantity T is controlled by the control unit ECU according to a control law, for example in closed loop, as explained more in detail below. For example, the control signal of the quantity T can be a control signal.

Hence, the control unit ECU is configured to determine a pair of values T(t), $V_{dc}(t)$ of the relative quantities T, $V_{dc}$ with reference to the current time instant t. In particular, the control unit ECU extracts the values T(t), $V_{dc}(t)$ from the emitted control signals.

Alternatively or in addition, the apparatus 3 comprises transducers S1, S2 configured to detect the quantities T, $V_{dc}$, respectively, or further quantities indicative thereof, as well as to generate respective signals associated with the detected quantities. For example, the transducer S1 detects a quantity a indicative of an output acceleration of the motor 2. Clearly, barring an inertial factor (for example, stored or provided by the control unit ECU), the acceleration is indicative of the torque delivered by the motor 2. In other words, the quantity a is indicative of the quantity T. Therefore, the quantity T is derivable from the quantity a or extractable from the signal generated by the transducer S1.

The control unit ECU is coupled to the transducers S1, S2 and is configured to acquire the signals generated therefrom. Therefore, the control unit ECU can determine or extract the values T(t), $V_{dc}(t)$ from the acquired signals coming from the transducers S1, S2.

The transducers S1, S2 should be considered as described independently of one another, so that each transducer S1, S2 may independently be present or absent.

Once the control unit ECU has determined the values T(t), $V_{dc}(t)$, the control unit ECU is configured to determine a value $\omega_{lim}(t)$ of the parameter $\omega_{lim}$ that corresponds to the values T(t), $V_{dc}(t)$ according to the provided or stored functional relationship.

Furthermore, the control unit ECU is configured to determine a value $\omega(t)$, with reference to the current instant t, of a quantity $\omega$ comparable with the parameter $\omega_{lim}$ and indicative of an output speed of the motor 2. For the sake of clarity, the term "comparable" may be meant as having the same unit of measurement and/or deductible relative to one another.

For example, the apparatus 3 could comprise a transducer S3 configured to detect the quantity $\omega$ and to generate an associated signal. The control unit ECU, in this case, would be coupled to the transducer S3 and configured to acquire the signal generated from the latter, as well as extract the value $\omega(t)$ from it.

Alternatively or in addition, the control unit ECU is advantageously configured to predict a value $\omega(t+k)$ of the quantity $\omega$ starting from the signal generated by the transducer S1 and acquired by the control unit ECU.

The expression t+k indicates a future time instant; in particular, the parameter k can indicate one or more time samples. More precisely, the time interval elapsing between the instants t, t+k, which has a duration corresponding to the parameter k, lasts at least three times the sampling time (namely, at least three time samples), preferably at least five times the sampling time. Specifically, the parameter k is worth 5 ms.

Hence, the predicted value $\omega(t+k)$ may be assigned to the value $\omega(t)$, basically advancing the future measurement to the current time instant t.

More in detail, the prediction of the value $\omega(t+k)$ is based on the solution, in particular numerical solution, of a first-order ordinary differential equation. Said differential equation has an unknown function, which has to be determined, and a known term. The unknown function corresponds to the quantity $\omega$; the known term can be extracted starting from the signal acquired at the current instant t.

For the sake of clarity, the numerical solution of the differential equation specifically corresponds, herein, to the solution of a finite difference equation. Therefore, the expression "differential equation" must be interpreted, herein, with a wide meaning, which covers both an actual differential equation in a continuous time domain and a finite difference equation in a discrete time domain.

In particular, the differential equation is numerically solved by means of an explicit method, for example the forward Euler method.

Therefore, the following equation applies:

$$\omega(t+k)=\omega(t)+ka(t)$$

wherein a(t) represents the value of the quantity a detected by the transducer S1 at the current time instant t. The control unit ECU may extract the value a(t) starting from the acquired signal coming from the transducer S1.

Preferably, the acquired signal coming from the transducer S1 may be subjected to a filtering step carried out by the control unit ECU before the extraction of the value a(t) or, anyway, before the prediction of the value $\omega(t+k)$. The filtering takes place by means of one or more suitable filters, for example of a known type.

The value $\omega(t)$ in the equation shown above may be extracted by the control unit ECU from the acquired signal coming from the transducer S3, but this is not limiting. As a matter of fact, the value $\omega(t)$ may constantly be updated by the control unit ECU through the solution of the differential equation starting from an initial condition $\omega(0)$ equal to zero or to any other known value.

At the end of the prediction, the value $\omega(t)$ takes on the predicted value $\omega(t+k)$ through assignation by the control unit ECU.

Once the control unit ECU has determined the values $\omega(t)$, $\omega_{lim}(t)$, the control unit ECU is configured to determine a value $\Delta\omega(t)$ of a quantity $\Delta\omega$ indicative of a difference between the values $\omega(t)$, $\omega_{lim}(t)$.

Herein, the term "difference" has to be interpreted in a wide manner; for instance, the quantity $\Delta\omega$ is the actual subtraction between the quantities $\omega$, $\omega_{lim}$, but a ratio between them would also be suited to indicate their difference. Furthermore, the standard deviation of the quantities $\omega$, $\omega_{lim}$, the difference between the moduli of the quantities $\omega$, $\omega_{lim}$ and the like are suited to indicate their difference. More in general, the term "difference" can be interpreted as a general concept of difference or diversity or deviation or inequality between the quantities $\omega$, $\omega_{lim}$.

Figure 4:
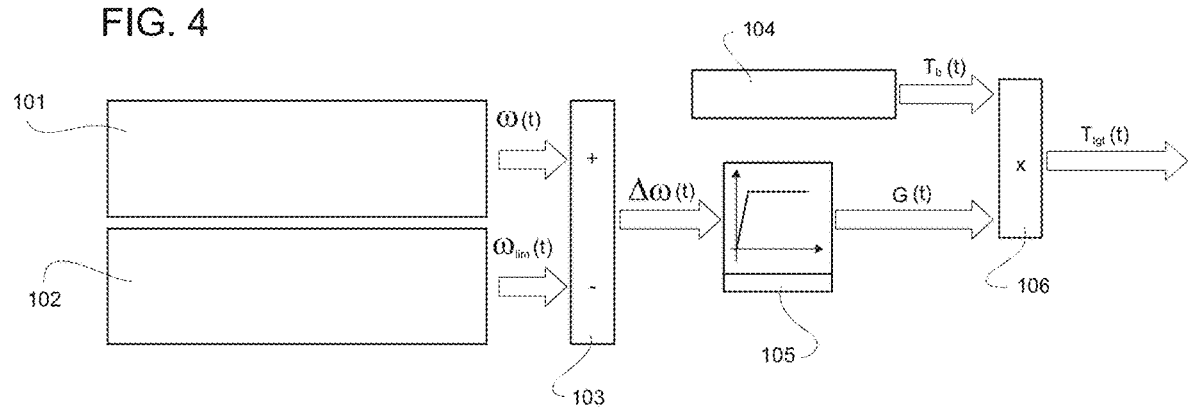
FIG. 4 is a block diagram showing steps of a process for controlling the motor according to a further embodiment of the invention.

FIG. 4 schematically shows the steps carried out to determine the values $\omega(t)$, $\omega_{lim}(t)$, $\Delta\omega(t)$ with reference numbers 101, 102, 103, respectively.

The control unit ECU is configured to determine a target value $T_{tgt}(t)$ for the quantity T as a function of the value $\Delta\omega(t)$, in particular so that the quantity $\Delta\omega$ indicate an increase in the modulus difference, namely so that the quantity $\omega$ strays away from the quantity $\omega_{lim}$, namely in order to cause the output speed of the electric motor 2 to stray away from the controllability limit. The target value $T_{tgt}(t)$ is associated with or relates to the current instant t.

The control unit ECU is configured to control the motor according to the determined target value $T_{tgt}(t)$. More precisely, as mentioned above, the control unit ECU controls the motor 2 in a closed loop. Therefore, the target value $T_{tgt}(t)$ is compared with a feedback value $T_{fb}(t)$ of the quantity T, for example extracted starting from the acquired signal coming from the transducer S1. The comparison leads to an error, on which a control law is based, for example of the PID type, to determine the control signal of the quantity T. In addition, an open loop control based on the target value $T_{tgt}(t)$ is also possible.

More in detail, the target value $T_{tgt}(t)$ is determined as result of a correction of a base value $T_b(t)$, in particular representative of a request of a driver of the vehicle 1 concerning the torque delivered by the motor 2. For example, the vehicle 1 comprises an accelerator device, specifically a pedal (not shown herein), which can be operated by the driver in order to express the request for torque delivered by the motor 2. The control unit ECU is coupled to the accelerator device and is configured to extract an item of information associated with the request expressed by the driver through the accelerator device itself. By so doing, the control unit ECU determines the base value $T_b(t)$ as a function of the extracted item of information. The determination of the base value $T_b(t)$ is indicated by reference number 104 in FIG. 4.

More precisely, though not necessarily, the correction is not always carried out, but it is performed at least when the value $\Delta\omega(t)$ fulfills a given condition. When it is performed, the correction can be based on the value $\Delta\omega(t)$, although this is not necessarily the case. For example, the condition can be completely arbitrary, even though it is predetermined or established.

For the sake of clarity, the term "correction" should be interpreted as a change in the base value $T_b(t)$, for example by means of a mathematical operation.

Specifically, the correction can take place by multiplying a gain G(t) by the base value $T_b(t)$, as shown in FIG. 4. Blocks 105, 106 of FIG. 4 represent the determination of the gain G(t) as a function of $\Delta\omega(t)$ and the operation of multiplication of the gain G(t) by the base value $T_b(t)$, respectively.

Alternatively, the correction could be carried out by algebraically adding a sum parameter to the base value $T_b(t)$; in this case, the sum parameter could still be determined as a function of the value $\Delta\omega(t)$, although not necessarily.

Generally speaking, the correction may comprise the application of a numerical corrective factor (for example, the gain G(t) or the sum parameter) to the base value $T_b(t)$ by means of a mathematical operator. The corrective factor can be determined by the control unit ECU as a function of the value $\Delta\omega(t)$.

In particular, the correction reduces the modulus of the base value $T_b(t)$.

More in particular, the modulus of the base value $T_b(t)$ is decreased to a greater extent the lower the value $\Delta\omega$ is, for example in a proportional manner.

Otherwise, the reduction of the modulus of the base value $T_b(t)$ or, more in general, the correction can take place by assigning an arbitrary value to the target value $T_{tgt}(t)$, for example equal to zero or to a value having an opposite sign with respect to the one of the base value $T_b(t)$ or smaller than a threshold. The value having an opposite sign can be assigned as a function of the value Δω(t) or independently thereof.

For example, the arbitrary value may be sufficiently low to ensure that a modulus of Δω(t) becomes or is greater than a threshold.

In other words, the target value $T_{tgt}(t)$ is determined by assigning the arbitrary value, for example when the value Δω(t) fulfills said condition.

For example, the multiplying gain G(t) could be a coefficient, for example positive and smaller than or equal to one, or smaller than and equal to one with no sign limits, or preferably ranging from −1 to 1, in particular with the extremes includes.

In addition, for example, the coefficient could decrease as the value Δω(t) decreases, for example in a proportional manner. Otherwise, the coefficient could take on a specific value, preferably independently of the value Δω(t); for example, the coefficient could be worth zero or also take on a negative value, if necessary even smaller than −1.

Preferably, the aforesaid condition is fulfilled when the value Δω(t) indicates that the difference between the values ω(t), $ω_{lim}(t)$ fulfills a predetermined relationship with a threshold.

For example, the condition is fulfilled when the value Δω(t) indicates that the subtraction between the values ω(t), $ω_{lim}(t)$ is equal to a zero threshold or that the modulus of the value ω(t) minus the modulus of the value $ω_{lim}(t)$ is smaller than a non-zero threshold.

In other words, this means that the controllability limit of the motor 2 is reached or exceeded. Hence, a quick intervention to restore the controllability of the motor 2 is appropriate.

In this case, according to a first example, the target value $T_{tgt}(t)$ is determined as equal to zero, regardless of the value Δω(t). Otherwise, according to a second example, the target value $T_{tgt}(t)$ is determined as equal to a value having an opposite sign with respect to the one of the base value $T_b(t)$; in this case, there is a target torque reversal strategy.

According to an alternative example, the aforesaid condition is fulfilled when the value Δω(t) indicates that the subtraction or difference between the values ω(t), $ω_{lim}(t)$ has a modulus that is smaller than a non-zero threshold.

In other words, this means that the difference or distance between the values ω(t), $ω_{lim}(t)$ is relatively small. Namely, the value ω(t) is close to the value $ω_{lim}(t)$.

When the condition is not fulfilled, which means that the value ω(t) is relatively far from the value $ω_{lim}(t)$, the correction is not applied. Hence, more in particular, the target value $T_{tgt}(t)$ coincides with the base value $T_b(t)$, specifically as a function of the torque request of the driver.

Specifically, the multiplying gain G(t) of the correction is one when the condition is not fulfilled.

Figure 5:
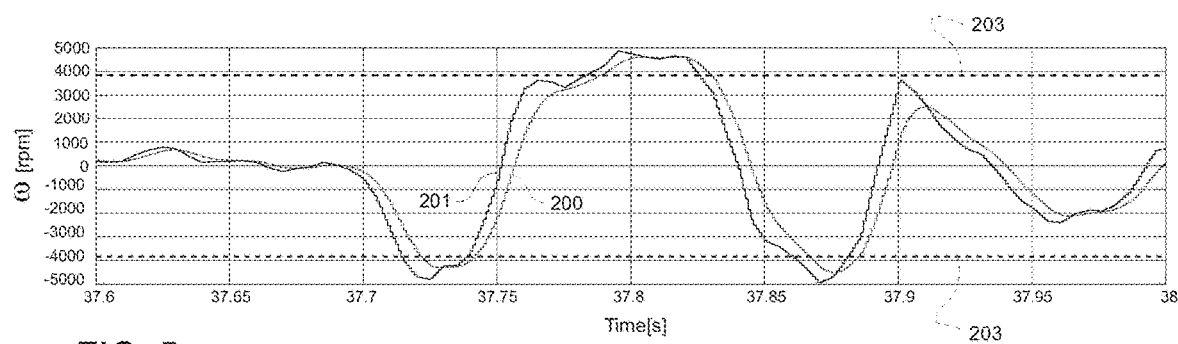
FIG. 5 is a diagram showing two time signals compared in the same time interval, wherein the signals indicate the actual output speed of the motor and an output speed of the motor predicted according to said process, respectively.

FIG. 5 is an example of comparison between quantities ω acquired and predicted by the control unit ECU in time interval. The abscissa of FIG. 5 represents time, whereas the ordinate represents the quantity ω. In FIG. 5, curve 200 represents the acquired quantity ω and curve 201 represents the predicted quantity ω. As shown in FIG. 5, the accuracy of the prediction is satisfactory. In FIG. 5, furthermore, lines 203 represent the constant parameter $ω_{lim}$ for the specific value $V^*_{dc}$. The constant value of the parameter $ω_{lim}$ is represented both with positive sign and with negative sign. Indeed, the specific value $V^*_{dc}$ corresponds to the modulus of the constant value. Therefore, the constant value can have both signs, as mentioned above.

Figure 6:
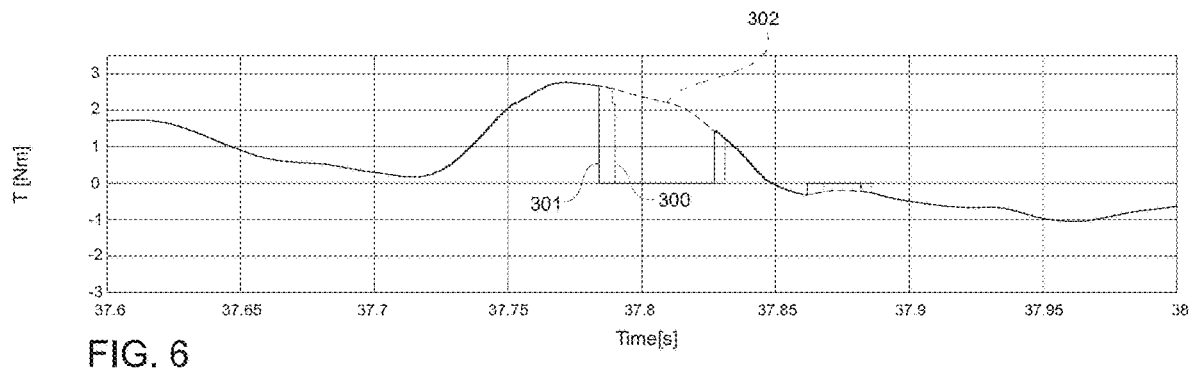
FIG. 6 is a diagram representing, in the time interval of FIG. 5, two possible target torque signals for the motor, which can be obtained by means of said process.

FIG. 6 shows the results of the determination of the target value $T_{tgt}(t)$ for the entire time interval of FIG. 5, considering both curve 200 and curve 201 for the determination of the quantity ω.

Herein, the determination takes place according to the specific first example discussed above: the target value $T_{tgt}(t)$ is set equal to zero when the condition is fulfilled, namely when the controllability limit of the motor 2 is reached or exceeded. This condition is represented by the intersection between curve 200 or 201 and one of the lines 203.

More precisely, curve 300 in FIG. 6 represents a target signal of the torque to be delivered by the motor 2 when the determined quantity ω corresponds to curve 200, namely when the values ω(t) for all current instants t of the time interval are determined through acquisition, without prediction. On the other hand, curve 301 in FIG. 6 represents a further target signal of the torque to be delivered by the motor 2 correspondingly to curve 201, namely when the values ω(t) for all current instants t of the time interval are determined through prediction. Indeed, curve 302 of FIG. 6 represents a target torque signal corresponding to the request of the driver, namely it represents a situation in which the aforesaid correction is never applied.

Curves 300, 301 show how the correction takes place in advance for curve 301 with respect to curve 300, thus revealing the effectiveness of the prediction.

Furthermore, FIGS. 5, 6 show how the sign of the quantity ω affects the correction. Indeed, for negative values ω(t), the correction leads to an increase in the respective target values $T_{tgt}(t)$ with respect to the corresponding base values. On the other hand, for negative values ω(t), the correction leads to an increase in the respective target values $T_{tgt}(t)$ with respect to the corresponding base values $T_b(t)$. Anyway, it is clear that the modulus of the target values $T_{tgt}(t)$ decreases, in any case, with respect to the corresponding base values when the correction intervenes.

When the correction takes place by means of the multiplying gain G(t), the aspect of the sign of the quantity ω becomes irrelevant for the purposes of the correction. Otherwise, when the correction takes place by means of the sum parameter, the latter has to be such as to increase the target value $T_{tgt}(t)$ with respect to the base value $T_b(t)$ for negative values ω(t), or such as to decrease the target value $T_{tgt}(t)$ with respect to the base value $T_b(t)$ for positive values ω(t).

Figure 7:
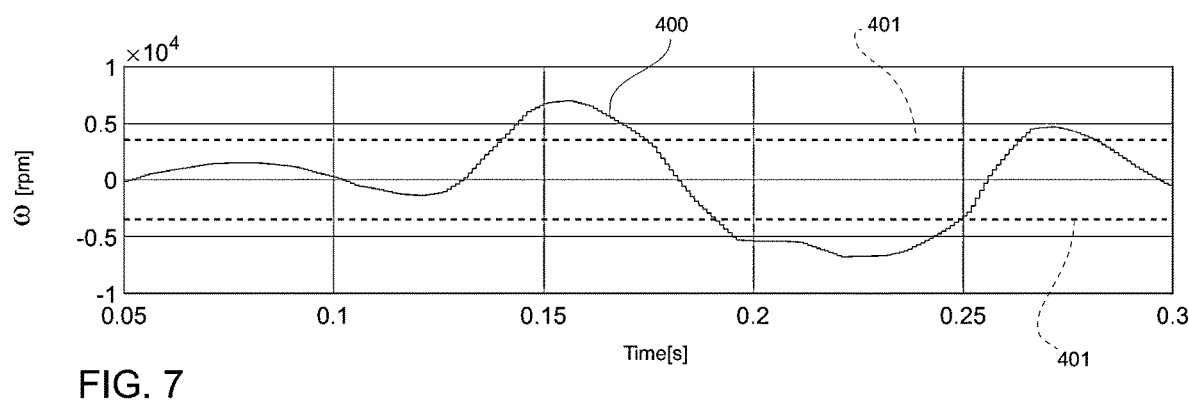
FIG. 7 is similar to FIG. 5 and represents a further signal, which indicates a further output speed of the motor predicted according to said process.

FIG. 7 is substantially similar to FIG. 5, even though it shows a different operating condition of the motor 2. In FIG. 7, curve 400 represents the predicted quantity ω. Furthermore, lines 401 represent the constant parameter $ω_{lim}$ for the specific value $V^*_{dc}$.

Figure 8:
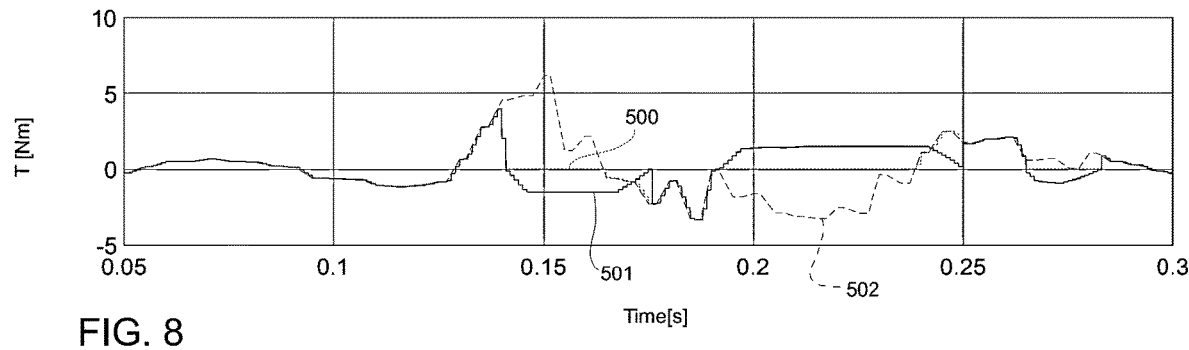
FIG. 8 represents, in the time interval of FIG. 6, two possible target torque signals for the motor, which can be obtained by means of said process.

FIG. 8 shows the results of the determination of the target value $T_{tgt}(t)$ for the entire time interval of FIG. 7, considering curve 400 for the determination of the quantity ω. The results of FIG. 8 relate to two different determinations compared with one another, according to the specific first and second example mentioned above, respectively. For the second example, the target value $T_{tgt}(t)$ is set equal to a value having an opposite sign with respect to the one of the base value $T_b(t)$ when the condition is fulfilled, namely when the controllability limit of the motor is reached or exceeded. Again, this condition is represented by the intersection between curve 400 and lines 401.

More precisely, curves 500, 501 in FIG. 8 represent target signals of the torque to be delivered by the motor 2 determined according to the first example and the second example, respectively. Curve 502 of FIG. 8 represents a target torque signal corresponding to the request of the driver, namely it represents a situation in which the correction is never applied.

The control unit ECU performs a process for controlling the motor 2 powered with the supply voltage.

The process comprises at least the steps of:
a) providing a functional relationship, which associates the quantities T, $V_{dc}$, indicative of the torque delivered by the motor 2 and of the supply voltage respectively, with the speed parameter $\omega_{lim}$ of the motor 2 representing a controllability limit of the motor 2,
b) determining the values T(t), $V_{dc}$(t) in association with the current time instant t,
c) determining the value $\omega$(t) of the quantity $\omega$ in association with the current time instant t, wherein the quantity $\omega$ is comparable with the speed parameter $\omega_{lim}$ and is indicative of an output speed of the motor 2,
d) determining the value $\omega_{lim}$(t) of the speed parameter $\omega_{lim}$ corresponding to the values T(t), $V_{dc}$(t) through the functional equation,
e) determining the value $\Delta\omega$(t) of the quantity $\Delta\omega$ indicative of a difference between the value $\omega_{lim}$(t) and the value $\omega$(t),
f) determining the target value $T_{tgt}$(t) for the quantity T in association with the current time instant t as a function of the value $\Delta\omega$(t), and
g) controlling the electric motor 2 according to the determined target value $T_{tgt}$(t).

Owing to the above, the advantages of the apparatus 3 and the process according to the invention are evident.

The apparatus 3 and the process substantially avoid an uncontrolled operation of the motor 2. As a matter of fact, the control unit ECU forcedly decreases the torque delivered by the motor 2 when the output speed thereof gets close to the controllability limits.

Furthermore, the prediction of the quantity $\omega$ allows the forced decrease to be advanced; by so doing, the motor uncontrollability risks are significantly reduced.

Finally, the apparatus 3 and the process according to the invention can be subjected to changes and variants, which, though, do not go beyond the scope of protection set forth in the appended claims.

The invention claimed is:

1. A process for controlling an electric motor supplied with a voltage, the process comprising the steps of
a) providing a functional relationship, which associates a first and a second quantity of actual torque delivered by the electric motor and of said voltage respectively, with a speed parameter of the electric motor, wherein the speed parameter is a limit output speed associated with mechanical characteristics unique to the electric motor, wherein the speed parameter increases with the second quantity according to said functional relationship,
b) determining a pair of values of the first and of the second quantity in association with a current time instant,
c) determining a value of a third quantity in association with the current time instant, wherein the third quantity is indicative of an output speed of the electric motor,
d) determining a value of the speed parameter corresponding to said pair of values through the functional relationship,
e) determining a value of a fourth quantity indicative of a difference between the value of the speed parameter and the value of the third quantity,
f) determining a target value for the first quantity in association with the current time instant as a function of the value of the fourth quantity, and
g) controlling the electric motor according to the determined target value such that the output speed of the electric motor does not exceed the limit output speed, wherein exceeding the limit output speed causes the electric motor to operate uncontrollably.

2. The process according to claim 1, wherein the target value is determined equal to an arbitrary value when the value of the fourth quantity fulfils a condition.

3. The process according to claim 2, wherein the condition is fulfilled when the value of the fourth quantity indicates that the difference has a modulus that is smaller than a non-zero threshold.

4. The process according to claim 2, wherein the arbitrary value is equal to zero.

5. The process according to claim 1, wherein the target value is determined as result of a correction of a base value, in association with the current time instant, at least when the value of the fourth quantity fulfils a condition; wherein the base value corresponds to a torque request for the electric motor.

6. The process according to claim 5, wherein the target value is determined as a value having opposite sign with respect to the sign of the base value.

7. The process according to claim 5, wherein the correction reduces the modulus of the base value.

8. The process according to claim 5, wherein the condition is fulfilled when the value of the fourth quantity indicates that the difference has a modulus that is smaller than a non-zero threshold.

9. The process according to claim 1, wherein step c) comprises:
h) acquiring a detected signal of the third quantity,
i) extracting the value of the third quantity from the acquired signal.

10. The process according to claim 1, wherein step c) comprises the steps of:
j) acquiring a detected signal of a fifth quantity indicative of an output acceleration of the electric motor,
k) predicting a further value of the third quantity from the acquired signal for a future time instant,
l) Assigning the predicted further value of the third quantity to the value of the third quantity relating to the current time instant.

11. The process according to claim 10, wherein step k) comprises the steps of:
m) solving a first-order ordinary differential equation comprising an unknown function corresponding to the third quantity and a known term determined from the acquired signal in association with the current time instant.

12. The process according to claim 10, wherein an interval between the current time instant and the future time instant has a duration that is equal to or greater than three times a sampling time of the acquired signal.

13. The process according to claim 12, wherein the duration is equal to or greater than five times the sampling time.

14. The process according to claim 1, wherein the speed parameter increases or remains constant as the first quantity decreases.

15. An apparatus for controlling an electric motor, the apparatus comprising a control unit, which is programmed to implement the process according to claim 1.

16. A vehicle comprising an electric motor and an apparatus according to claim 15.

17. A process for controlling an electric motor supplied with a voltage, the process comprising the steps of providing a functional relationship, which associates a first and a second quantity with a limit output speed associated with and unique to the electric motor, wherein the first quantity is a torque value measured by a transducer, and wherein the second quantity is a measurement of said voltage, determining a pair of values of the first and of the second quantity in association with a current time instant, determining a value of a third quantity in association with the current time instant, wherein the third quantity is an output speed of the electric motor, determining a value of the limit output speed corresponding to said pair of values through the functional relationship, determining a value of a fourth quantity indicative of a difference between the value of the limit output speed and the value of the third quantity, determining a target value for the first quantity in association with the current time instant as a function of the value of the fourth quantity, and controlling the electric motor according to the determined target value such that the output speed does not exceed the limit output speed, and decreasing torque delivered by the electric motor when the output speed approaches the limit output speed to prevent the electric motor from exceeding the limit output speed and operating uncontrollably.

* * * * *